(12) United States Patent
Sosa et al.

(10) Patent No.: US 6,486,271 B1
(45) Date of Patent: Nov. 26, 2002

(54) METHOD OF CONTROLLING MOLECULAR WEIGHT DISTRIBUTIONS DURING A POLYMERIZATION PROCESS

(75) Inventors: Jose M. Sosa, Deer Park, TX (US); Aron T. Griffith, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/803,598

(22) Filed: Mar. 9, 2001

(51) Int. Cl.$^7$ .............................. C08F 6/06; C08F 12/02
(52) U.S. Cl. ........................ 526/65; 526/86; 526/228; 526/230.5; 526/232.3; 526/346; 525/53; 525/387; 528/501
(58) Field of Search .................. 525/53, 333.3, 525/387; 526/228, 65, 86, 230.5, 232.3, 346; 528/501

(56) References Cited

U.S. PATENT DOCUMENTS

| | | | |
|---|---|---|---|
| 4,125,696 A | * | 11/1978 | Kamath ................. 526/228 X |
| 4,777,210 A | | 10/1988 | Sosa et al. |
| 5,540,813 A | | 7/1996 | Sosa et al. |
| 6,353,066 B1 | * | 3/2002 | Sosa ...................... 526/347 X |

* cited by examiner

Primary Examiner—Fred Teskin
(74) Attorney, Agent, or Firm—Hitt Gaines & Boisbrun

(57) ABSTRACT

The present invention provides to overcome the deficiencies of the prior art, the present invention provides a method of producing a polymer. The method includes taking a product stream from a monovinyl aromatic polymerization system wherein the product stream comprises a polymerized monomer and a monomer. The product stream is introduced into an up-flow heat exchanger in a presence of an initiator, such as a peroxide, that affects a polymerization of the monomer in the up-flow heat exchanger. The initiator may include a low-temperature initiator and a high-temperature initiator where a ratio of the high-temperature initiator to the low-temperature initiator can range from about 0:600 to about 50:600.

42 Claims, 3 Drawing Sheets

METHOD OF CONTROLLING MOLECULAR WEIGHT DISTRIBUTIONS DURING A POLYMERIZATION PROCESS

TECHNICAL FIELD OF THE INVENTION

The present invention is directed, in general, to a method of controlling molecular weight distributions during a polymerization process and, more specifically, to a method of controlling molecular weight distribution during a polymerization process in an up-flow heat exchanger and in the presence of an initiator.

BACKGROUND OF THE INVENTION

The polymerization of styrene is a very important industrial process that supplies materials used to create a wide variety of polystyrene containing articles, such as cups, thin films and foams. The use of polystyrene in this wide range of articles results from the ability to fine tune the parameters of the polymerization process. Thus, these variations in the polymerization conditions are of utmost importance since they allow control over the physical properties of the resulting polymer. These physical properties determine the suitability of a polystyrene for particular applications. Properties of particular importance are the weight averaged molecular weight ($M_W$) of the polymer, molecular weight distribution (MWD), and melt flow index (MFI). For a desired application, these physical characteristics must be controlled and optimized to achieve a polystyrene material that will have characteristics within the tolerances of desired product.

One general method of controlling these properties requires processes by which the low molecular weight components, such as starting monomer, dimers and trimers, are removed from the desired polymer product. Vacuum distillation is one method for removing these components. As the name implies, vacuum distillation subjects the product mixture to low-pressures to extract the volatile components. Another method known as flash volatilization may involve the application of low pressure as well as heat to further extract remaining volatile components. In addition to these methods, chemical agents, such as steam, can be used to strip volatile components from the polymer product stream. Processes which employ one or more of these approaches are known in the art.

U.S. Pat. No. 3,311,676 issued to Toekes teaches a method for removing low molecular weight components of a polystyrene by using a preheater, a heat-exchanger, and a low-pressure phase separator. In Toekes the pre-heater heats the reaction mixture and the heat exchanger maintains this temperature at the reduced pressure generated by the phase separator. This method produces a foam that allows for rapid removal of volatiles and results in a monomer and ethylbenzene concentration below about 1000 ppm.

U.S. Pat. No. 3,865,672 issued to Mertzinger disclosed a process for removing volatiles from a polymer using a single stage vacuum distillation system. More importantly, the process employs a vertical heat exchanger operated in a down-flow configuration. In a down-flow configuration the polymer mixture is fed to the top of the vertical heat exchanger and volatile components are removed as the mixture flows downward toward the end of the heat exchanger. In this system the mixture is subjected to greater temperatures as it flows toward the bottom of the down-flow heat exchanger. Mertzinger reports that the concentration of volatiles achieved by this process is reduced about 3000 ppm.

A down-flow falling strand devolatilizer is disclosed in U.S. Pat. No. 3,928,300 to Hagberg. In this process heated polymer is extruded through a plurality of apertures at the top of a reduced-pressure vessel. The extrusion of the polymer through the apertures increases the surface area of the mixture, thereby facilitating the removal of volatile components.

U.S. Pat. No. 5,540,813 issued to Sosa, et. al. (Sosa '813), which is incorporated herein by reference, discloses a method and apparatus method that reduces residual monomer content by a combination of serially arranged heat exchangers and devolatilizers in conjunction with the polymerization reactor system. Upon exiting the reactor system, the polymer mixture enters an up-flow type heat exchanger before entering a down-flow heat exchanger under reduced pressure. The mixture then enters a second devolatilizer containing a hoop nozzle manifold. By controlling the temperature in the various modules, this method not only allows removal of substantial portions of volatile components, but also allows strict control over parameters such as the molecular weight distribution and the melt flow index.

However, as production temperatures approach their upper limit, increasing reaction and devolatilization temperatures to achieve production improvements become very problematic. Therefore, what is needed in the art is a process by which substantial portions of volatile components can be eliminated while maintaining strict control over molecular weight, molecular weight distribution and melt flow index, yet does not require higher temperatures nor additional process steps.

SUMMARY OF THE INVENTION

To overcome the deficiencies of the prior art, the present invention provides a method of producing a polymer. In a preferred embodiment, the method includes taking a product stream from a monovinyl aromatic polymerization system wherein the product stream comprises a polymerized monomer and a monomer. The product stream is introduced into an up-flow heat exchanger in a presence of an initiator, such as a peroxide, that affects a polymerization of the monomer in the up-flow heat exchanger. In one advantageous embodiment, the initiator includes a first initiator and a second initiator where a ratio of the second initiator to the first initiator can range from about 0:600 to about 50:600. In a more specific embodiment, the ratio of the second initiator to the first initiator in the portion ranges from about 0:400 to about 50:400 and a ratio of the second initiator to the first initiator in the remaining portion is about 0:200.

In a particular embodiment, the first initiator may be a low-temperature initiator and the second initiator may be a high-temperature initiator. Alternatively, the second initiator may be an intermediate-temperature initiator.

In another advantageous embodiment, the method further includes forming a polymerized monomer in the up-flow heat exchanger to form a second product stream and devolatilizing the second product stream to form a polymerized monomer having a molecular weight distribution ranging from about 2.8 to about 3.3.

In yet another embodiment, the present invention provides a method of producing a polystyrene which includes taking a product stream from a styrene polymerization system that includes polystyrene and styrene and introducing the product stream into an up-flow heat exchanger in a presence of an initiator, which affects a polymerization of styrene.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
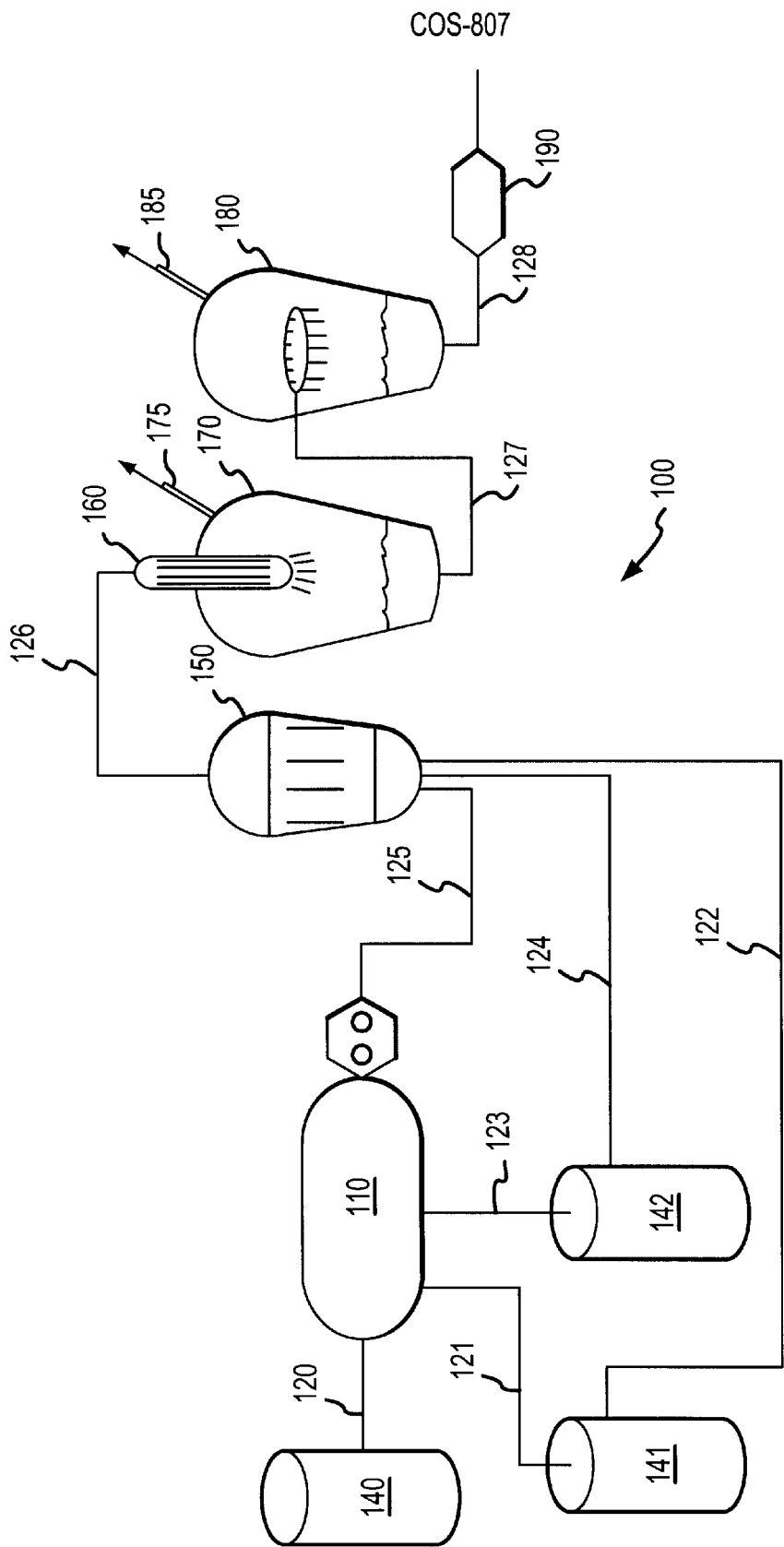
FIG. 1 illustrates a schematic representation of the polymerization system of the present invention.

Referring initially to FIG. 1, there is illustrated a schematic representation of the polymerization system 100 of the present invention having a stirred tank reactor system 110. Reactor system 110 may comprise a series of one or more reactors for manufacturing polystyrene. Flowlines 120, 121, and 122 link the reactor 110 with storage containers 140, 141, and 142.

In an embodiment of the present invention, flowline 120 transports a vinylbenzene from storage container 140 to the reactor 110. Also, in this embodiment flowline 121 may transport a first initiator from storage container 141 to the reaction vessel 110. Flowline 123 may transport a second initiator to the reactor 110. In such embodiments the reactor system 110 may be operated at a temperature in the range of about 100° C. to about 160° C. The polymerization process in reactor 110 ranges for a period from about 4 hours to about 6 hours. The particular conditions of this process may be determined by monitoring the percent solids in the reactor system. In an embodiment of the invention, the percent solids exiting reactor system 110 ranges from approximately 60% to approximately 70%.

In a particular embodiment, an initiator may be a member of the peroxide family. Particularly useful peroxides include peresters, perketals, and peroxycarbonates. Commercial quantities of these compounds can be obtained from Akzo Nobel, 300 South Riverside Rd., Chicago, Ill.; ATOFINA Chemicals, Market Street, Philadelphia, Pa.; Aztec Peroxides, Inc., 7600 West Tidwell, Houston, Tex. As is well known to one skilled in the art, such peroxides are selected on the basis of their decomposition rates at different temperatures. Such half-life information is available from the suppliers. For the process to be described, a low-temperature peroxide initiator is one having a half-life of about a one hour at about 110° C. to about 120° C. An intermediate-temperature initiator may have about a one hour half-life at between about 120° C. and about 130° C. and a high-temperature initiator would have a half-life of about a one hour above about 130° C.

In advantageous embodiments, the low-temperature initiator may be a low-temperature initiator, such as 1,1 di(t-amyl peroxy) cyclohexane (Atofina Lupersol 531), which is a particularly useful low-temperature initiator for this process. The concentration of the low-temperature initiator in a reactor of system 110 may range from about 0 ppm to about 600 ppm. More specifically, the concentration of low-temperature initiator may range from about 200 ppm to about 600 ppm. In other embodiments the initiator may be introduced to the reactor system 110 in first and second portions. In these embodiments, the second portion may be introduced after the first portion in the same reactor of reactor system 110 or may be introduced after the first portion in a subsequent reactor of the reactor system 110. In any event, the first portion of initiator should be sufficient to achieve a concentration ranging from about 200 ppm to about 400 ppm in the polymer product stream. The second portion of initiator may be sufficient to achieve a concentration in the product stream ranging from about 0 ppm to about 200 ppm.

Other embodiments of the present invention may include a peroxide initiator known to those skilled in the art as a high-temperature initiator. Particularly useful high-temperature initiators include 3,3 di(t-butyl peroxy) butyrate (Atofina Lupersol 533). In those embodiments where a high-temperature initiator is included, the concentration of the high-temperature initiator may range from about 0 ppm to about 300 ppm in the reaction mixture. In particular embodiments the concentration of high-temperature initiator may range from about 0 ppm to about 50 ppm. Still other embodiments may include an intermediate-temperature initiator. Particularly useful intermediate-temperature initiators include OO-t-butyl O-isopropyl monoperoxycarbonate (TBIC), 2,2-di(t-butylperoxy)butane (BU-50), and t-butylperoxy benzoate (TBP) in concentrations from about 0 ppm to about 300 ppm.

In still other embodiments of the present invention the initiator may include a combination of initiators. In such embodiments the first initiator may be a low-temperature initiator and the second may be either an intermediate-temperature initiator or a high-temperature initiator. Alternatively, the combination of initiators may be an intermediate temperature-initiator and a high-temperature initiator. In such embodiments, the concentration of low-temperature initiator may range from about 0 ppm to about 600 ppm, that of the intermediate-temperature initiator from about 0 to about 300 ppm, while that of the high-temperature initiator may range from about 0 ppm to about 300 ppm. In advantageous embodiments, the concentration of low-temperature initiator may range from about 200 ppm to about 600 ppm, while the concentration of intermediate- or high-temperature initiator may range from about 0 ppm to about 50 ppm. One skilled in the art will realize that these concentrations are not limiting and any concentrations yielding a polymer product with the desirable properties discussed below may be employed.

In a preferred embodiment, after the initiators are added, the resulting polymer product stream enters the heat exchanger unit 150 through flowline 125. Heat exchanger 150 is preferably of the up-flow variety where the heated polymer product stream enters at the bottom end of the vessel and flows upward through the heat exchanger 150 and exits at the top of the vessel. The polymer product stream preferably has a residence time in the heat exchanger 150 of about 15 to about 20 minutes. The residence time is measured by the average amount of time required for a molecule in the polymer stream to flow from the entrance of the heat exchanger 150 to the exit of the heat exchanger 150. The heat exchanger 150 may be operated at a temperature in the range of about 100° C. to about 230° C., or at a temperature sufficient to support polymerization.

In other embodiments an initiator may be introduced to the heat exchanger separately from the product stream. In such embodiments, one or more initiators are introduced from flowlines 122 and 124 directly into heat exchanger 150. Where the initiators are introduced into heat exchanger 150, rather than into reactor system 110, the concentration of low-temperature initiator present in the product stream may range from about 0 ppm to about 70 ppm and the concentration of high-temperature initiator may range from about 5 ppm to about 50 ppm.

As the above description indicates, the initiators may be introduced into the polymerization process in reactor system 110 or directly in the heat exchanger 150. When the initiators are introduced to reactor system 110, the concentration is sufficient to permit a concentration of the initiator be present when the product stream enters heat exchanger 150. Surprisingly, the presence of initiator in the heat exchanger results in improved control over the molecular weight distribution and melt-flow properties of the resulting polymer.

After the polymer product stream has passed through the heat exchanger 150, it may flow through flowline 126 to one or more downstream heat exchangers, for example downflow heat exchanger 160. Down-flow heat exchanger 160 may be maintained at a temperature of about 245° C. and may be situated in a flash devolatilization tank 170 maintained at a pressure in the range of about 20 torr to about 200 torr. The combination of heat and low pressure allows volatile components to be removed through vapor removal line 175 as the polymer stream exits the devolitization tank 170.

After having been at least partially devolatilized in the devolatilization tank 170, the polymer mixture may also be passed through flow line 127 to a second downstream devolatilizer 180. In a particular embodiment downstream devolatizer 180 may have a hoop falling strand configuration. The second downstream devolatilizer 180 is operated at a pressure of less than about 1 Torr to about 20 Torr. Additional volatile components may be removed through vapor line 185. Then, flowline 128 transports the polymer mixture from the second downstream devolatilizer 180 to a finishing operation 190, such as a pelletizer, where the polymer product stream is cooled and readied for further processing or shipment to the consumer. This polymerization process employing chemical initiators in combination with thermal polymerization allows the preparation of devolatilized monovinylic aromatic polymer, such as polystyrene, at reduced temperatures and allows strict control over the melt flow index and molecular weight distribution of the polymer product.

EXAMPLES

Table I below indicates specific operating parameters from pilot plant operations utilizing the process of the present invention and how the different parameters of the present process may be manipulated to obtain polymer products having different characteristics.

Initial experiments were performed in the presence of both a low-temperature initiator and a high-temperature initiator. In these experiments the low-temperature initiator 1,1-di-(t-amylperoxy)cyclohexane was placed in the reactor system 110 at a concentration of 300 ppm along with a concentration of 50 ppm of the high-temperature initiator ethyl 3,3 di(t-butyl peroxy) butyrate. The temperature of the reactor system 110 was gradually increased from 105° C. to 130° C. as the product was moved through the system. After the product stream exited reactor system 110, a sample was removed for determination of the number averaged molecular weight ($M_n$), the molecular weight averaged molecular weight ($M_W$), and molecular weight distribution (MWD). At this point, $M_n$ was about 151,000, $M_W$ was about 361,000 and the MWD was 2.4. The polymer product stream was also tested after passing through the heat exchanger 150 and the devolatilization processes. This finished polymer had a $M_n$ of about 124,000, $M_W$ of about 322,000, a MWD of 2.6 and a melt flow index of about 1.66.

The effect of increased concentration of low-temperature initiator in reactor system 110 was investigated. The concentration of low-temperature initiator 1,1-di-(t-amylperoxy)cyclohexane was increased to 400 ppm while retaining the concentration of 50 ppm of the high-temperature initiator ethyl 3,3 di(t-butyl peroxy) butyrate in the reactor system 110. The product stream was sampled after exiting reactor system 110. At this stage the product stream had a $M_n$ of about 163,000, a $M_W$ of about 363,000 and a MWD of 2.2. After passing the product stream through the upstream heat exchanger and the devolitization process, the product surprisingly had a $M_n$ of about 111,000, a $M_W$ of approximately 315,000 and a MWD of 2.8. The melt flow index for this product was 1.79.

In another experiment, the amount of low-temperature initiator was divided into two equal portions. The first aliquot of 1,1-di-(t-amylperoxy)cyclohexane was sufficient to create a concentration of 200 ppm in reactor system 110, which was maintained at 113° C. The same high-temperature initiator was added to create a concentration of 50 ppm in the reactor system. The second aliquot of low-temperature initiator was added subsequently at a temperature of 107° C. Surprisingly, the final product had an increased $M_W$ of about 331,000 while the MWD was unchanged at 2.8. It is thought that this increase in MW resulted from the increased amounts of low-temperature initiator that remained in the product stream after the polymer left reactor system 110.

A similar experiment used higher levels of low-temperature initiator. The first aliquot was doubled to establish a concentration of 400 ppm in the reactor system while retaining the 50 ppm concentration of high-temperature initiator. The second aliquot of low-temperature initiator, sufficient to increase the concentration of low-temperature initiator by 200 ppm in the product stream, was subsequently added. Under these conditions the MW and MWD after the reactor system 110 ranged from about 379,000 to about 393,000 and 2.1 and 1.9 respectively. However, the $M_W$ of the final product decreased to between about 325,000 and about 322,000 while the MWD ranged from 3.0 to 3.1. The melt flow indices of these products ranged from 1.96 to 1.92.

Another set of experiments were performed using the low-temperature initiator in the absence of high-temperature initiator. In these cases, the amount of initiator was sufficient to establish a concentration of 400 ppm in the reactor system 110. This formulation produced a product stream with a $M_W$ of approximately 385,000 to about 443,000 after reactor system 110. The MWD at this point ranged from 2.1 to 1.9. After passing through upstream heat exchanger 160 and the devolitilization process, the final product had a $M_W$ of about 324,000 to about 363,000, a MWD of 3.0–3.3, and a melt flow index of 1.79 to 1.36. These unexpected, disparate results are thought to be due to increased conversion in up-flow heat exchanger 150.

In yet another experiment, the effect of intermediate-temperature initiator was explored. In these experiments the low-temperature initiator 1,1-di-(t-amylperoxy)cyclohexane was placed in the reactor system 110 at a concentration of 400 ppm along with a concentration of 50 ppm of the OO-t-butyl O-isopropyl monoperoxycarbonate (TBIC). In this case, the $M_W$ was 432,611 after the product stream exited reactor system 110. The MWD was increased to 2.3. With this formulation, the finished polymer product had a $M_W$ of about 355,000, and MWD of 3.1, and a melt flow index of 1.44.

The relationship of initiator concentration in the up-flow heat exchanger 160 and the change in the number averaged molecular weight, $M_n$, was investigated. To do so, the steady state concentration of initiators remaining in the product stream as it exits the reactor system 110 were estimated. These results are recorded in Table 2.

Figure 2:
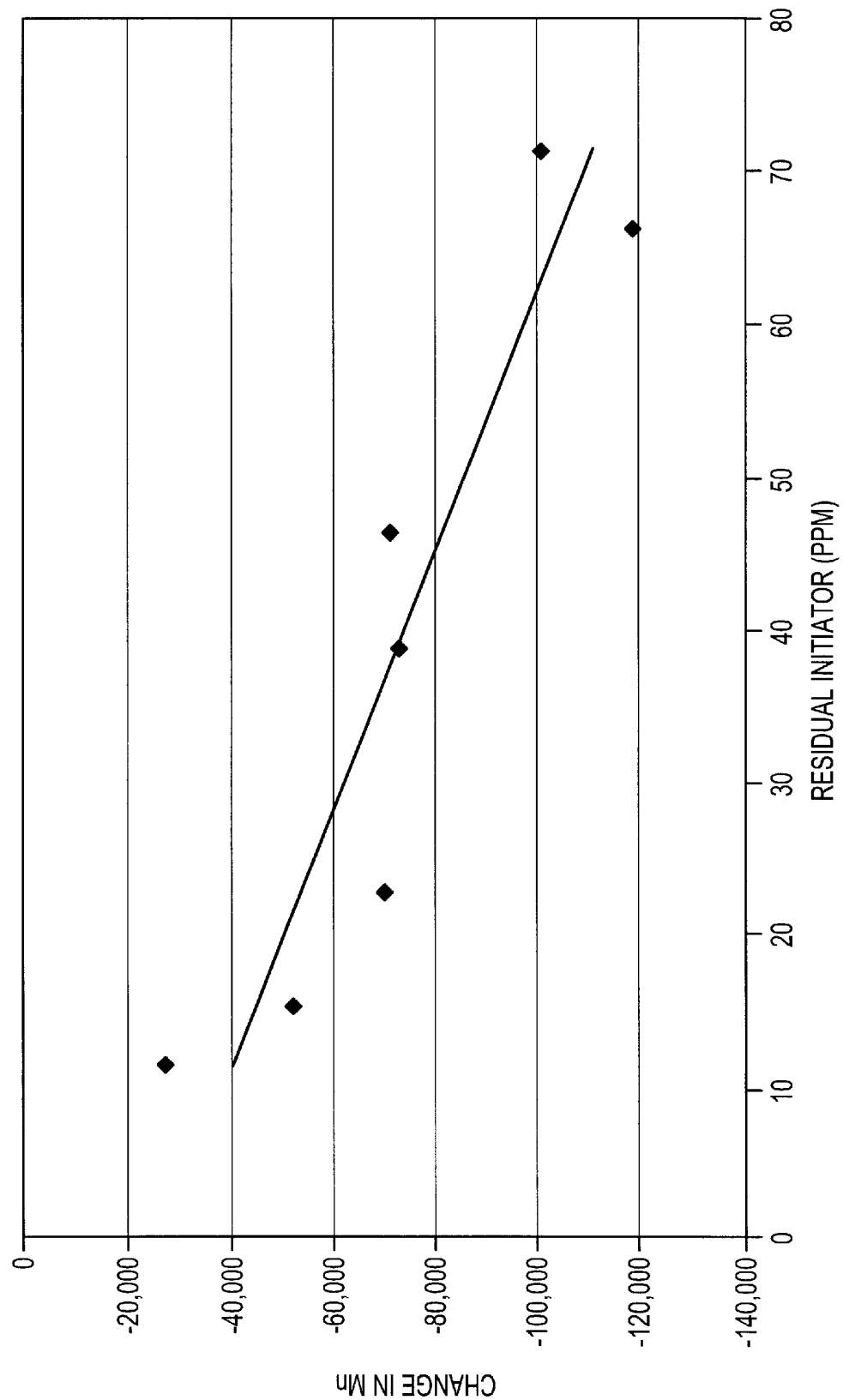
FIG. 2 illustrates the relationship between the change in number average molecular weight and the concentration of residual initiator.

It is thought that the relatively low-temperature of the product stream in the up-flow heat exchanger 160 indicates that the amount of higher temperature initiators that react in this portion of the process is negligible compared to the amount of low-temperature initiator that reacts. FIG. 2 depicts the relationship between the change in number averaged molecular weight, $M_n$, and the estimated amount of unreacted initiator reaching the up-flow heat exchanger. This figure surprisingly suggests that a substantial portion of the low molecular weight species are formed after the reactor system 110 due to residual initiator in the heat exchanger 160.

TABLE I

|  | 1 | 2 | 3 | 4 | 5 | 6 |
|---|---|---|---|---|---|---|
| Initiator 1 | L531 | L531 | L531 | L531 | L531 | L531 |
| Initial Dose (ppm) | 300 | 400 | 200 | 400 | 400 | 400 |
| Second Dose (ppm) | 0 | 0 | 200 | 200 | 0 | 0 |
| Initiator 2 | L533 | L533 | L533 | L533 | L533 | TBIC |
| Dose (ppm) | 50 | 50 | 50 | 50 | — | 50 |
| $M_{W,AR}$ (in thousands) | 361 | 363 | — | 379–393 | 385–443 | 433 |
| $M_{n,AR}$ (in thousands) | 151 | 163 | — | 180–205 | 179–230 | 184 |
| $MWD_{AR}$ | 2.4 | 2.2 | — | 2.1–1.9 | 2.1–1.9 | 2.3 |

TABLE I-continued

|  | 1 | 2 | 3 | 4 | 5 | 6 |
|---|---|---|---|---|---|---|
| $M_{W,final}$ (in thousands) | 322 | 315 | 331 | 325–322 | 324–363 | 355 |
| $M_{n,final}$ (in thousands) | 124 | 111 | 117 | 109–103 | 107–112 | 114 |
| $MWD_{final}$ | 2.6 | 2.8 | 2.8 | 3.0–3.1 | 3.0; 3.3 | 3.1 |
| $MFI_{final}$ | 1.65 | 1.79 | 1.62 | 1.96–1.92 | 1.79–1.36 | 1.44 |

L531 indicates Atofina Lupersol 531; L533 indicates Atofina Lupersol 533; AR indicates corresponding value measured after reactor system 110; and Final indicates corresponding value measured after the complete process.

TABLE II

|  | 1 | 2 | 3 | 4 | 5 | 6 |
|---|---|---|---|---|---|---|
| Initiator 1 | L531 | L531 | L531 | L531 | L531 | L531 |
| Initial Dose (ppm) | 300 | 400 | 200 | 400 | 400 | 400 |
| Second Dose (ppm) | 0 | 0 | 200 | 200 | 0 | 0 |
| Conc.$_{AR1}$ (ppm) | 0.01 | 0.14 | 3.95 | 26.62–27.60 | 38.67–66.05 | 15.36 |
| Initiator 2 | L533 | L533 | L533 | L533 | L533 | TBIC |
| Initial Dose (ppm) | 50 | 50 | 50 | 50 | 0 | 50 |
| Conc.$_{AR2}$ (ppm) | 11.28 | 14.95 | 20.36 | 19.55–43.47 | 0 | 7.20 |
| $\Delta_{Mn}$ | (27,102) | (51,954) | — | (70,512)–(101,251) | (72,366)–(118,680) | (69,718) |
| $\Delta_{Mw}$ | 0.2 | 0.6 | — | 0.9–1.2 | 0.9–1.4 | 0.8 |

L531 indicates Atofina Lupersol 531; L533 indicates Atofina Lupersol 533; AR1 indicates the amount of initiator 1 remaining in the product stream after reactor system 110; and AR2 indicates the amount of initiator 2 remaining in the product stream after reactor system 110.

Figure 3:
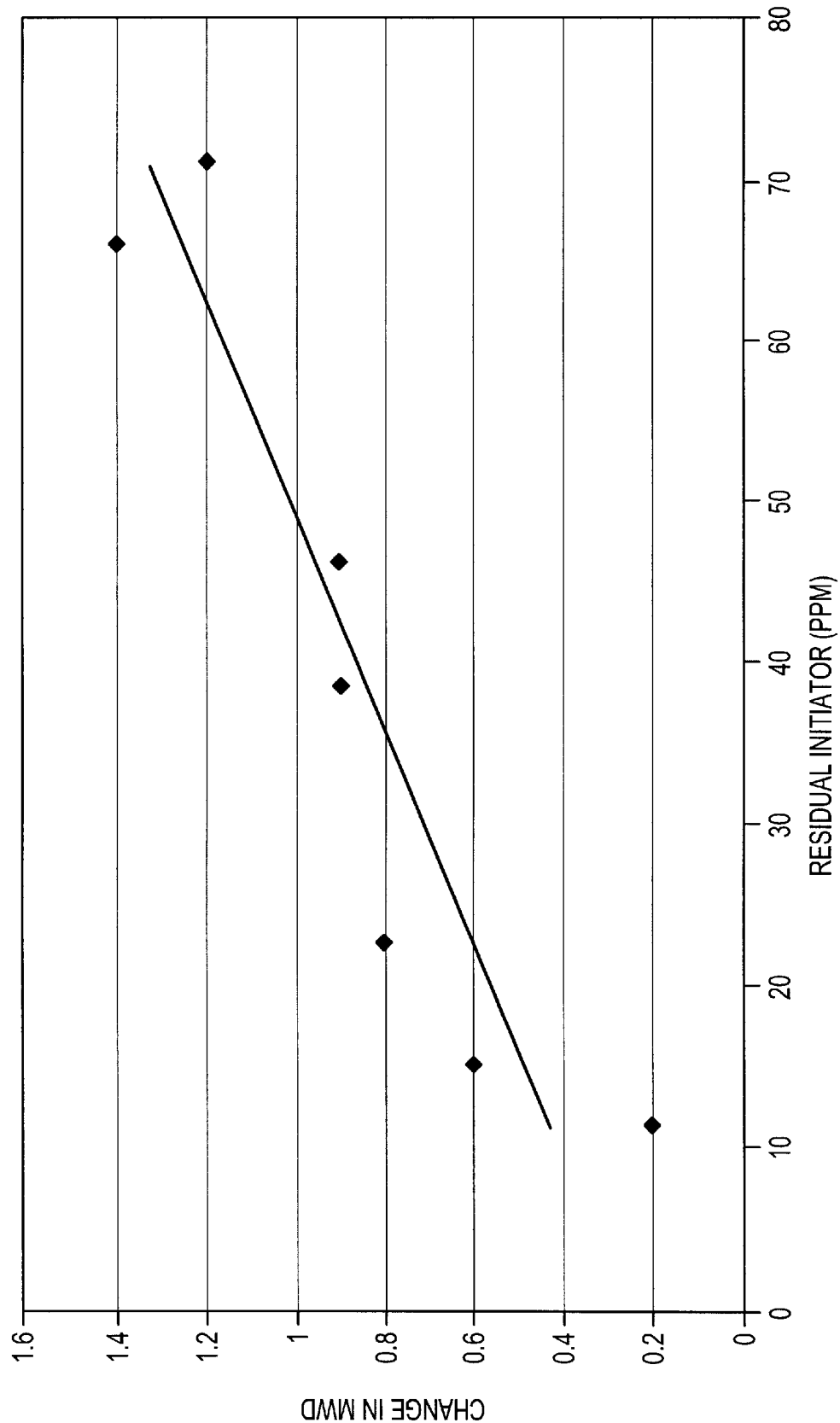
FIG. 3 illustrates the relationship between the change in Molecular weight distribution and the residual initiator concentration.

Likewise, FIG. 3 shows the relationship between the change in MWD and residual initiator. While the $M_W$ values measured as the product stream exited the reactor system were fairly insensitive over the range of experimental conditions, the change in MWD between the reactor system and the final product follows the same general trend as the Mn values. Again, suggesting that the change in MWD correlates with residual initiator in the up-flow heat exchanger.

The trends represented in FIGS. 2 and 3 suggest that controlling the polymer product stream characteristics may be related to the initiator concentrations. In general, it is thought that greater quantities of initiator surviving the reactor system to react in the up-flow heat exchanger produce greater quantities of lower molecular weight species in the product stream.

Although the present invention has been described in detail, those skilled in the art should understand that they can make various changes, substitutions and alterations herein without departing from the spirit and scope of the invention in its broadest form.

What is claimed is:

1. A method of producing a polymer, comprising: taking a product stream from a monovinyl aromatic polymerization system, said product stream comprising a polymerized monomer and a monomer; and introducing said product stream into an up-flow heat exchanger in a presence of a portion of an initiator introduced into a first reactor and introducing a remaining portion of said initiator into a second reactor prior to introducing said product stream into said up-flow heat exchanger, said initiator affecting a polymerization of said monomer.

2. The method as recited in claim 1 wherein said initiator comprises from about 200 ppm to about 600 ppm of said product stream.

3. The method as recited in claim 1 wherein said product stream includes said initiator.

4. The method as recited in claim 1 wherein said initiator includes a first initiator and a second initiator.

5. The method as recited in claim 4 wherein said first initiator is a low-temperature initiator and said second initiator is a high-temperature initiator.

6. The method as recited in claim 4 wherein said first initiator is a low-temperature initiator and said second initiator is an intermediate-temperature initiator.

7. The method as recited in claim 4 wherein a ratio of said second initiator to said first initiator ranges from about 0:600 to about 50:600.

8. The method as recited in claim 4 wherein a ratio of said second initiator to said first initiator in said portion ranges from about 0:400 to about 50:400 and a ratio of said second initiator to said first initiator in said remaining portion is about 0:200.

9. The method as recited in claim 1 wherein an operating temperature of said up-flow heat exchanger ranges from about 100° C. to about 230° C.

10. A method of producing a polymer, comprising:
taking a product stream from a monovinyl aromatic polymerization system, said product stream comprising a polymerized monomer and a monomer; and
introducing said product stream into an up-flow heat exchanger in a presence of an initiator, wherein introducing said product stream into said up-flow heat exchanger includes introducing said initiator into said up-flow heat exchanger separately from said product stream, said initiator affecting a polymerization of said monomer.

11. The method as recited in claim 1 wherein a residence time of said product stream in said up-flow heat exchanger ranges from about 15 minutes to about 20 minutes.

12. The method as recited in claim 1 wherein said initiator is a peroxide.

13. The method as recited in claim 12 wherein said peroxide includes a low-temperature peroxide and a high-temperature peroxide.

14. The method as recited in claim 13 wherein said low-temperature peroxide is 1,1 di(t-amyl peroxy) cyclohexane and said high-temperature peroxide is a ethyl 3,3 di(t-butyl peroxy) butyrate.

15. The method as recited in claim 13 wherein said peroxide includes a low-temperature peroxide and an intermediate-temperature peroxide.

16. The method as recited in claim 15 wherein said low-temperature peroxide is 1,1 di(t-amyl peroxy) cyclohexane and said intermediate-temperature peroxide is a OO-t-butyl O-isopropyl monoperoxycarbonate.

17. The method as recited in claim 1 further including forming a polymerized monomer in said up-flow heat exchanger to form a second product stream, devolatilizing said second product stream to form a polymerized monomer having a molecular weight distribution ranging from about 2.6 to about 3.3.

18. The method as recited in claim 17 wherein devolatilizing includes sequentially introducing said second product stream into first and second devolatilizers.

19. The method as recited in claim 18 wherein said first and second devolatilizers are downstream devolatilizers.

20. A method of producing a polystyrene, comprising:
taking a product stream from a styrene polymerization system, said product stream comprising polystyrene and styrene; and
introducing said product stream into an up-flow heat exchanger in a presence of a portion of an initiator introduced into a first reactor and introducing a remaining portion of said initiator into a second reactor prior to introducing said product stream into said up-flow heat exchanger, said initiator affecting a polymerization of styrene.

21. The method as recited in claim 20 wherein said initiator comprises from about 200 ppm to about 600 ppm of said product stream.

22. The method as recited in claim 20 wherein said product stream includes said initiator.

23. The method as recited in claim 20 wherein said initiator includes a first initiator and a second initiator.

24. The method as recited in claim 23 wherein said first initiator is a low-temperature initiator and said second initiator is a high-temperature initiator.

25. The method as recited in claim 23 wherein said first initiator is a low-temperature initiator and said second initiator is an intermediate-temperature initiator.

26. The method as recited in claim 23 wherein a ratio of said second initiator to said first initiator ranges from about 0:600 to about 50:600.

27. The method as recited in claim 23 wherein a ratio of said second initiator to said first initiator in said portion ranges from about 0:400 to about 50:400 and a ratio of said second to said first initiator in said remaining portion is about 0:200.

28. The method as recited in claim 20 wherein an operating temperature of said up-flow heat exchanger ranges from about 100° C. to about 230° C.

29. A method of producing a polystyrene, comprising:
taking a product stream from a monovinyl aromatic polymerization system, said product stream comprising a polymerized monomer and a monomer; and
introducing said product stream into an up-flow heat exchanger in a presence of an initiator, wherein introducing said product stream into said up-flow heat exchanger includes introducing said initiator into said up-flow heat exchanger separately from said product stream, said initiator affecting a polymerization of said monomer.

30. The method as recited in claim 20 wherein a residence time of said product stream in said up-flow heat exchanger ranges from about 15 minutes to about 20 minutes.

31. The method as recited in claim 20 wherein said initiator is a peroxide.

32. The method as recited in claim 31 wherein said peroxide includes a low-temperature peroxide and a high-temperature peroxide.

33. The method as recited in claim 32 wherein said low-temperature peroxide is 1,1 di(t-amyl peroxy) cyclohexane and said high-temperature peroxide is a ethyl 3,3 di(t-butyl peroxy) butyrate.

34. The method as recited in claim 31 wherein said peroxide includes a low-temperature peroxide and an intermediate-temperature peroxide.

35. The method as recited in claim 34 wherein said low-temperature peroxide is 1,1 di(t-amyl peroxy) cyclohexane and said intermediate-temperature peroxide is a OO-t-butyl O-isopropyl monoperoxycarbonate.

36. The method as recited in claim 20 further including forming polystyrene in said up-flow heat exchanger to form a second product stream, devolatilizing said second product stream to form a polystyrene having a molecular weight distribution ranging from about 2.8 to about 3.3.

37. The method as recited in claim 36 wherein devolatilizing includes sequentially introducing said second product stream into first and second devolatilizers.

38. The method as recited in claim 37 wherein said first and second devolatilizers are downstream devolatilizers.

39. The method as recited in claim 10 wherein said initiator comprises from about 5 ppm to about 70 ppm of said product stream.

40. The method as recited in claim 10 wherein said initiator comprises from about 5 ppm to about 50 ppm of said product stream.

41. The method as recited in claim 29 wherein said initiator comprises from about 5 ppm to about 70 ppm of said product stream.

42. The method as recited in claim 29 wherein said initiator comprises from about 5 ppm to about 50 ppm of said product stream.

* * * * *